Nov. 17, 1936.   R. BERINGER   2,060,971
SYNCHRONIZING CLUTCH MECHANISM
Filed Nov. 14, 1935
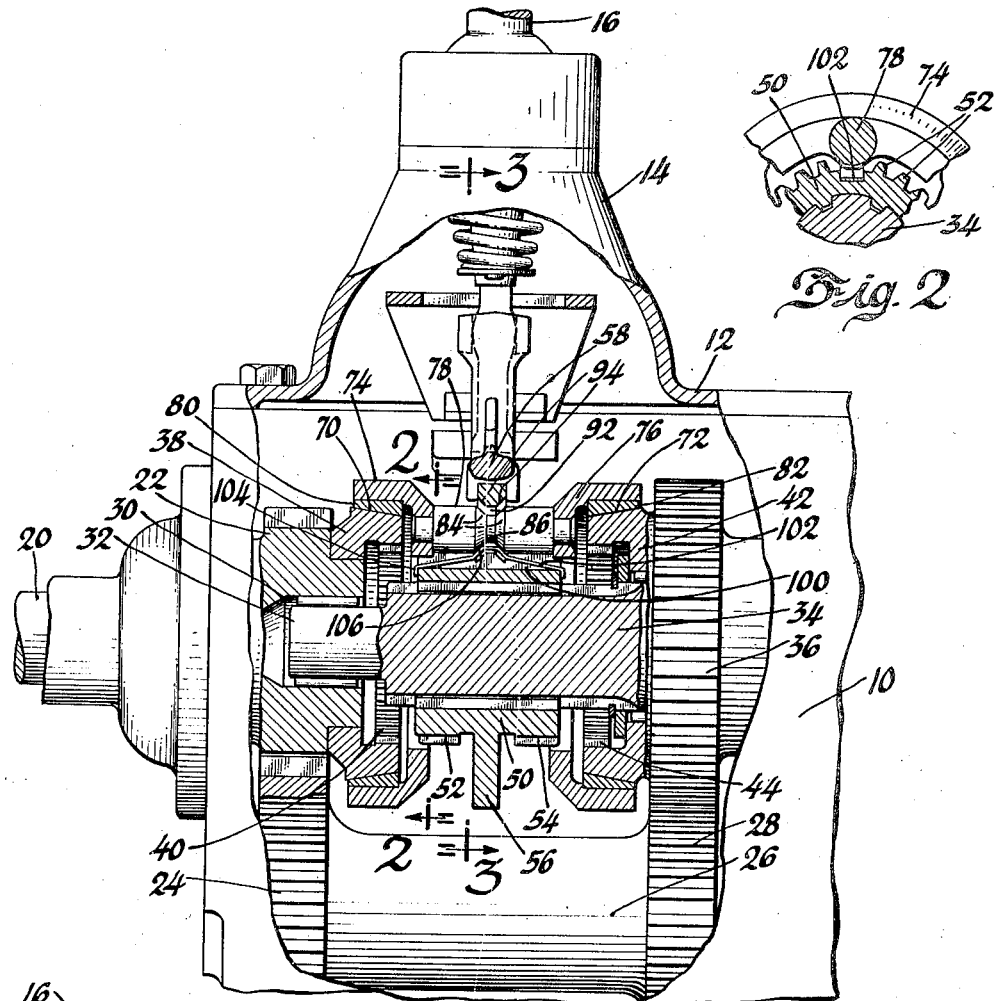
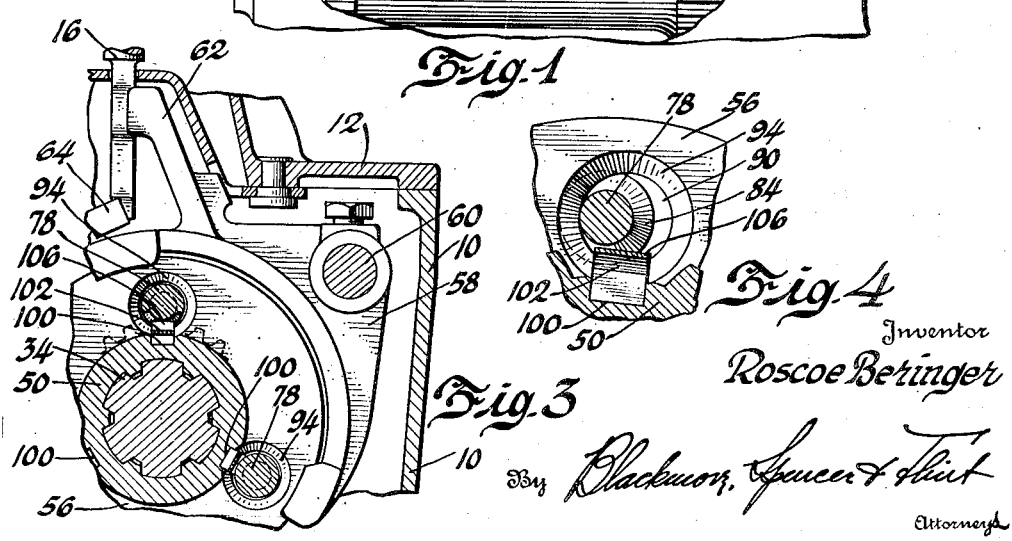
Inventor
Roscoe Beringer
By Blackmore, Spencer & Flint
Attorneys Patented Nov. 17, 1936

2,060,971

UNITED STATES PATENT OFFICE 2,060,971

SYNCHRONIZING CLUTCH MECHANISM

Roscoe Beringer, Detroit, Mich., assignor to General Motors Corporation, Detroit, Mich., a corporation of Delaware Application November 14, 1935, Serial No. 49,686

7 Claims. (Cl. 192—53)

This invention relates to synchronizing clutch mechanism associated with change speed gearing particularly adapted for motor vehicle power transmission mechanism.

The object is to enable toothed coupling elements that may be rotating at different speeds to be brought to the same speed before intermeshing them.

The invention comprises composite positive and friction clutches of the so-called inertia check type and is an improvement on the mechanism disclosed in an application of E. A. Thompson, Serial No. 48,971, filed November 9, 1935. It includes as an important characteristic a simplified means for insuring alinement of the checking surfaces on slidable toothed and friction coupling elements, when the former is advanced, in order to apply synchronizing force to the latter and retard advance of the former until synchronism of the toothed coupling elements has been substantially effected by the friction coupling.

In the accompanying drawing, in which like reference characters indicate like parts throughout the several views:—

Fig. 1 shows the gear box of an automobile transmission mechanism partly broken away and exposing the inclosed mechanism partly in longitudinal section;

Fig. 2 is a fragmentary cross section on the line 2—2 of Fig. 1 viewed in the direction indicated by the arrows;

Fig. 3 is a cross section taken on line 3—3 of Fig. 1 looking in the direction indicated by the arrows;

Fig. 4 is a fragmentary section illustrating the checking surfaces in alinement.

Numeral 10 indicates the body of the gear box or casing, which has a cover 12 embodying a tower-like upward projection 14 in which shift lever 16 is fulcrumed. The lower end of shift lever 16 is adapted to selectively engage and shift either a yoke arranged selectively to move first and reverse gears into or out of mesh or another yoke arranged to connect or disconnect second or third speed trains.

The main clutch shaft 20 carries a gear 22 at its rear end within casing 10. Gear 22 meshes with a gear 24 fixed to counter shaft 26, which also carries fixedly a second speed gear 28, and suitable gears (not shown) for the first speed and reverse trains. The rear end of shaft 20 is drilled as at 30 to receive the pilot end 32 of the spline shaft 34. A second speed gear 36 is mounted to be capable of free rotation about shaft 34 and is in constant mesh with counter shaft second speed gear 28.

Spline shaft 34 must be locked to main clutch shaft 20 in order that power may be transmitted in third speed or direct drive from the engine (not shown). Gear 36 must be locked to shaft 34 in order that power may be transmitted in second speed to shaft 34 through gears 22, 24, 28 and 36.

In order that shafts 20 and 34 may be interlocked, and gear 36 positively coupled to shaft 34, shaft 20 and gear 36 are provided with positive clutch elements; and a double ended slidable positive coupling element splined to shaft 34 is arranged to interlock selectively with either the positive clutch element of shaft 20 or the positive clutch element on gear 36.

Rigidly secured to the rearward end of shaft 20 is a positive clutch element 38 comprising an annular projection having internal clutch teeth 40. Rigidly formed on the forward face of gear 36 is an annular projection 42 comprising a positive clutch element having internal clutch teeth 44.

The double ended slidable positive coupling element 50 is keyed to the spline shaft 34 and is provided with external clutch teeth 52 on the forward end and 54 on the rearward end adapted respectively to interlock with the internal teeth 40 on the clutch element 38 of shaft 20, and with the teeth 44 on the clutch element 42 of gear 36.

Slidable coupling element 50 is provided midway of its ends with a flange 56 engaged by a shift yoke 58 which is mounted on a rail 60 and has an upward projecting arm 62 adapted to be interlocked with shift lever 16 at a point between its lower end and fulcrum as in patent to P. L. Tenney No. 1,886,850, November 8, 1932.

The lower end of the shift lever is adapted to be interlocked with a second yoke a fragment of which is shown at 64 in Fig. 3 mounted on another rail for shifting into first and reverse gear trains, not shown because not a part of this invention.

In order that shaft 20 may be brought to substantially the same angular speed as shaft 34 before slidable coupling element 50 is moved to interlock its teeth 52 with teeth 40 of clutch element 38; and in order that gear 36 may be brought to the angular speed of shaft 34 before movement of slidable coupling element 50 to interlock its teeth 54 with the teeth 44 of clutch element 42 on second speed gear 36 occurs, friction clutches are brought into action in order to selectively connect shaft 20 with shaft 34 or shaft 34 with gear 36.

Said friction clutches consist of a cone clutch element on shaft 20 and a similar cone clutch element on gear 36 cooperating with rigidly connected cooperating clutch drums constituting a double-ended axially movable friction clutch element.

The cone clutch element on shaft 20 consists of the formation on annular projection 38 having the conical surface 70 surrounding the teeth 40. The cone clutch element on gear 36 consists of a similar cone formation with external conical surface 72 surrounding the teeth 44 on annular projection 42.

The double-ended axially movable friction clutch element that coacts with the said conical friction clutch surfaces 70 and 72 on shaft 20 and gear 36 respectively consists of two cupped clutch rings or drums 74 and 76 rigidly connected by bars or pins 78 so that they move in unison as one piece. Rings 80, 82 of bronze or other suitable material having internal conical surfaces are pressed into the drums.

The pins 78 have reduced ends inserted through holes in the drums 74 and 76 and riveted securely. Midway between the drums, pins 78 are reduced in thickness, measured tangentially, by a notch preferably in the form of a circular groove having conical shoulders or sides 84 diverging from a cylindrical central portion 86.

Pins 78 pass through holes 90 formed in the flange 56 of slidable coupling 50. Preferably there are three pins 78 equiangularly spaced connecting the clutch drums and three holes in flange 56 through which the pins pass. Holes 90 are of a diameter a trifle greater than the greatest diameter of pins 78 so that a sliding fit exists between flange and pins in order that the flange may move axially over the pins when the positive clutch elements are to be interlocked. Each hole 90 is cylindrical as indicated at 92 where its axial extent is about the same but not greater than that of the reduced mid portion 86 of pin 78. Said holes are countersunk at opposite sides in flange 56 in order to form conoidal surfaces 94 that diverge from the axes of the holes preferably at the same angles that the conical surfaces 84 on pins 78 diverge from the axes of the pins.

Each series 52 and 54 of clutch teeth on coupling element 50 consists of three groups equiangularly spaced and interrupted by grooves 100 parallel with the axis. The center lines of the grooves 100 lie in the same radial planes as the axes of the pins 78 when hole 90 in flange 56 fits over the larger diameter of the pin as occurs when coupling element 50 is engaged either with clutch element 38 or clutch element 42. Said grooves communicate laterally with or interrupt and merge into holes 90 as shown. Within each groove is seated a strong metallic leaf spring 102 with widely diverging limbs which terminate in end lugs 104 arranged parallel and engaging the coupling element 50 at the ends of the grooves so that axial movement of the coupling element in either sense moves the springs with it. The central portion 106 of each spring consists of a truncated V-shaped projection fitting within the conoidal sided peripheral groove in the pin 78 that is adjacent.

When the coupling element 50 is slid by the shifter fork in an axial direction, the springs 102 are moved in the same direction, and by reason of the engagement of the V-shaped projection 106 of the springs with the peripheral grooves of the pins, the pins and clutch drums are moved with them and enough pressure is exerted between the conical surfaces of the axially fixed and axially movable friction surfaces to cause the axially movable element, namely the drum, to move angularly in unison with the axially fixed element until the pins 78 are carried to one side or the other of the holes in flange 56. When the pins have been moved by this friction drag initiated by the action of springs 102, the checking surfaces 84 and 94 are in registration or alinement. Then continued force exerted in an axial direction upon the coupling element 50 forces also the friction drum more firmly into contact with its companion clutch element to produce a pressure adequate to effect synchronization of the toothed elements to be coupled. When synchronization occurs the inertia force which kept the checking surfaces together disappears and the force being exerted upon the positive coupling element 50 during the shifting operation displaces the slidable friction coupling element angularly so that the positive coupling element slides freely toward its interlocking position, the holes in flange 56 permitting the flange to slide axially over the pins 78.

I claim:

1. In variable speed power transmission mechanism, the combination of a shaft; an axially fixed positive clutch element capable of rotation independently of the shaft around the axis thereof; a positive coupling element slidable axially on but rotatably fixed to said shaft, said element having openings therein the axes of which are substantially parallel with the axis of said shaft; a friction clutch element rigid with said axially fixed positive clutch element; an axially movable friction clutch element cooperating with said friction clutch element that is rigid with the axially fixed positive clutch element; pins rigidly connected with said axially movable friction clutch element, each pin having a cross-sectional dimension adapted to provide a sliding fit in one of the openings in said slidable coupling element, and also a reduced portion forming opposite checking surfaces and limiting relative angular movement between the slidable positive clutch element and the axially movable friction clutch element, and leaf springs attached to the slidable positive clutch element to move axially therewith said springs having means to engage said pins and resist independent axial movement of the slidable positive clutch element with respect to the slidable friction coupling element.

2. In a variable speed power transmission mechanism, the combination of a shaft; axially spaced and axially fixed positive clutch elements capable of rotation independently of said shaft around the axis thereof; a positive coupling element slidably keyed to said shaft and adapted to be interlocked selectively with either axially fixed positive element, said slidable clutch element having openings parallel with the axis of the shaft; friction clutch elements rigid with said axially fixed positive elements; axially movable friction clutch elements cooperating with said axially fixed friction clutch elements; pins rigidly connecting said axially movable friction clutch elements, said pins extending through the openings in the slidable positive coupling element, each pin having spaced shoulders, the transverse width of the pins in a tangential direction between said shoulders being less than the width of the openings in the slidable positive coupling element and therefore allowing limited angular movement of the axially movable friction clutch elements with respect to the slidable positive coupling element, the shoulders of said pins forming checking surfaces cooperating with the edges of said openings, and leaf springs attached to the sliding positive coupling, said springs having means engaging said pins to resist axial movement of the slidable positive coupling element with respect to the slidable friction coupling element.

3. In variable speed power transmission mechanism, the combination of a shaft; axially spaced and axially fixed positive clutch elements capable of rotation independently of said shaft around the axis thereof; a positive coupling element slidably keyed to said shaft and adapted to be interlocked selectively with either of said axially fixed positive clutch elements, said slidable coupling element having openings parallel with the axis of the shaft; friction clutch elements rigid with said axially fixed positive clutch elements; axially movable friction clutch elements cooperating with said axially fixed friction clutch elements; pins rigidly connecting said axially movable friction clutch elements, said pins extending through the openings in the slidable positive coupling element, each pin having spaced shoulders, the cross-sectional dimensions of the pins between said shoulders being less than the width of the openings in the slidable positive coupling element and therefore allowing limited angular movement of the axially movable friction clutch elements relative to the slidable positive coupling element, the shoulders of said pins forming checking surfaces cooperating with the edges of said openings, and leaf springs attached to the slidable positive coupling element to move axially therewith, said springs having projections engaging between the shoulders of the pins.

4. In variable speed power transmission mechanism, a combination as defined in claim 3 wherein the openings in the slidable positive coupling element are round holes with conical countersinks at each end and the pins have axially spaced conical shoulders diverging from the axis at approximately the angle of divergence of the countersinks in the holes in said slidable positive coupling element, and the leaf springs are provided midway of their lengths with said projections which are beveled to fit substantially against the conical shoulders of the pins.

5. In variable speed power transmission mechanism, the combination of a shaft; separated axially fixed positive clutch elements capable of rotation independently of said shaft around the axis thereof; a positive coupling element slidably keyed to said shaft adapted to be interlocked selectively with either of said axially fixed positive clutch elements, said slidable coupling element having a circumferential flange provided with openings parallel with the axis; friction clutch elements rigid with said axially fixed positive clutch elements; axially movable friction clutch elements cooperating with said axially fixed friction clutch elements; pins rigidly connecting said axially movable friction clutch elements, said pins passing through the openings in said flange of the slidable positive coupling element, each pin having a circumferential groove permitting limited angular movement of the slidable friction clutch elements relative to the slidable positive coupling element, the shoulders of said groove forming checking surfaces cooperating with the edges of said openings, and leaf springs attached to the slidable positive coupling element to move axially therewith, said springs having projections engaging the grooves in the pins.

6. In variable speed power transmission mechanism, a combination as defined in claim 5 wherein the slidable coupling element is provided with equiangularly spaced groups of teeth on each end, separated by grooves parallel with the axis and merging with the openings in the flange, said leaf springs being within the grooves.

7. In variable speed power transmission mechanism, a combination as defined in claim 5 wherein the slidable coupling element is provided with equiangularly spaced groups of teeth on each end, separated by grooves parallel with the axis and merging with the openings in the flange, said leaf springs being within the grooves and having terminal lugs engaging with the opposite ends of the slidable coupling element at the ends of the grooves.

ROSCOE BERINGER.